US008060423B1

(12) United States Patent
Rukonic et al.

(10) Patent No.: US 8,060,423 B1
(45) Date of Patent: Nov. 15, 2011

(54) METHOD AND SYSTEM FOR AUTOMATIC CATEGORIZATION OF FINANCIAL TRANSACTION DATA BASED ON FINANCIAL DATA FROM SIMILARLY SITUATED USERS

(75) Inventors: Marko Rukonic, San Jose, CA (US); James Robert Del Favero, Mountain View, CA (US); Chris Lee, San Francisco, CA (US); George A. Hansen, Danville, CA (US); Benjamin Weiss, Portola Valley, CA (US); Barron R. Ernst, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 741 days.

(21) Appl. No.: 12/059,372

(22) Filed: Mar. 31, 2008

(51) Int. Cl.
*G06Q 40/00* (2006.01)
*G06F 17/30* (2006.01)

(52) U.S. Cl. ............................ 705/35; 707/737; 707/950

(58) Field of Classification Search .................... 705/35; 707/737, 950
See application file for complete search history.

(56) References Cited

U.S. PATENT DOCUMENTS

| | | | | | |
|---|---|---|---|---|---|
| 5,559,313 | A | * | 9/1996 | Claus et al. | 705/30 |
| 5,754,938 | A | * | 5/1998 | Herz et al. | 725/116 |
| 6,363,488 | B1 | * | 3/2002 | Ginter et al. | 726/1 |
| 7,403,906 | B2 | * | 7/2008 | Coleman | 705/14.66 |
| 7,437,330 | B1 | | 10/2008 | Robinson et al. | |
| 7,558,777 | B1 | | 7/2009 | Santos | |
| 2001/0027408 | A1 | | 10/2001 | Nakisa | |
| 2002/0107809 | A1 | | 8/2002 | Biddle et al. | |
| 2002/0111725 | A1 | | 8/2002 | Burge | |
| 2002/0173986 | A1 | | 11/2002 | Lehew et al. | |
| 2002/0198801 | A1 | | 12/2002 | Dixon et al. | |
| 2003/0009402 | A1 | | 1/2003 | Mullen et al. | |
| 2003/0120570 | A1 | | 6/2003 | Dellinger et al. | |
| 2003/0139985 | A1 | | 7/2003 | Hollar et al. | |
| 2003/0144938 | A1 | | 7/2003 | Lahre et al. | |
| 2003/0177076 | A1 | | 9/2003 | Might et al. | |
| 2003/0222134 | A1 | | 12/2003 | Boyd | |
| 2004/0024638 | A1 | * | 2/2004 | Restis | 705/14 |
| 2004/0158360 | A1 | | 8/2004 | Garland, II et al. | |
| 2005/0015272 | A1 | | 1/2005 | Wind et al. | |
| 2005/0071262 | A1 | | 3/2005 | Kobeh et al. | |
| 2005/0080701 | A1 | | 4/2005 | Tunney et al. | |
| 2005/0138440 | A1 | | 6/2005 | Barr et al. | |
| 2006/0101323 | A1 | * | 5/2006 | Satyavolu | 715/501.1 |

(Continued)

OTHER PUBLICATIONS

Getting Started with Quicken® 2007, copyright 2006, Chapters 1 and 2.
Getting Started with Quicken® Home & Business, copyright 2006, Chapter 2.

(Continued)

*Primary Examiner* — Mary Cheung
*Assistant Examiner* — Daniel L Greene
(74) *Attorney, Agent, or Firm* — Gunnison, McKay & Hodgson, L.L.P.; Philip McKay

(57) ABSTRACT

Financial data associated with one or more "contributing consumers" is obtained from one or more sources and categorized and associated with a specific expense/income category. One or more attributes associated with the contributing consumers are then identified and used to analyze, aggregate, and categorize the financial data according to the attributes. Data representing a user financial transaction is then obtained for categorization and one or more specific user attributes associated with the user are identified. The user financial transaction is then categorized based, at least in part, on the categorization of similar contributing consumer financial transactions by contributing consumers having at least one of the specific user attributes.

18 Claims, 2 Drawing Sheets

U.S. PATENT DOCUMENTS

| | | |
|---|---|---|
| 2006/0212338 A1 | 9/2006 | Bogle et al. |
| 2006/0242050 A1 | 10/2006 | Haggerty et al. |
| 2007/0011071 A1 | 1/2007 | Cuscovitch et al. |
| 2007/0055597 A1 | 3/2007 | Patel et al. |
| 2007/0088641 A1 | 4/2007 | Aaron et al. |
| 2007/0118394 A1* | 5/2007 | Cahoon .............................. 705/1 |
| 2007/0136177 A1 | 6/2007 | Reeth et al. |
| 2007/0192165 A1 | 8/2007 | Haggerty et al. |
| 2007/0265902 A1 | 11/2007 | Brennen et al. |
| 2008/0065437 A1 | 3/2008 | Dybvig |
| 2008/0195451 A1 | 8/2008 | Abram |
| 2010/0268640 A1 | 10/2010 | Kuyper et al. |

OTHER PUBLICATIONS

Del Favero et al., "Method and System for Predictive Event Budgeting Based on Financial Data from Similarly Situated Consumers", U.S. Appl. No. 12/058,014, filed Mar. 28, 2008.

Friel et al., "Method and System for Automatic Categorization of Financial Transactions as Business Financial Transactions or Personal Financial Transactions", U.S. Appl. No. 12/108,772, filed Apr. 24, 2008.

Klieman et al., "Method and System for Modifying Financial Transaction Categorization Lists Based on Input From Multiple Users", U.S. Appl. No. 12/265,021, filed Nov. 5, 2008.

* cited by examiner

METHOD AND SYSTEM FOR AUTOMATIC CATEGORIZATION OF FINANCIAL TRANSACTION DATA BASED ON FINANCIAL DATA FROM SIMILARLY SITUATED USERS

BACKGROUND

Currently, various computing system implemented financial management systems are available and implemented by individuals, businesses, financial institutions, such as banks, credit card companies and investment companies. These computing system implemented financial management systems include, but are not limited to: computing system implemented personal and small business financial management systems; computing system implemented tax preparation systems; computing system implemented business accounting systems; and computing system implemented medical expense management systems; as well as various other data driven financial management systems.

Computing system implemented financial management systems typically help users manage their finances by providing a centralized interface with banks, credit card companies, and other various financial institutions, for electronically identifying and categorizing user financial transactions. Currently, computing system implemented financial management systems typically obtain electronic transaction based information, such as payee, payment amount, date, etc. via communication with banks, credit card providers, or other financial institutions, using electronic data transfer systems such as the Open Financial Exchange (OFX) specification, or various other systems for transferring financial transaction data.

Typically a computing system implemented financial management system's ability to identify and categorize specific financial transactions is what allows the computing system implemented financial management system to provide the features that are typically of interest to the user. Typically, the ability to categorize specific financial transactions is, in turn, dependent on an ability of the computing system implemented financial management system to obtain the data necessary to identify and categorize specific financial transactions.

Using some currently available computing system implemented financial management systems, the data necessary to identify and categorize specific financial transactions is obtained directly from the user by manual and/or semi-manual input. Some computing system implemented financial management systems then use this manual user input to learn and categorize future identical, or substantially similar, specific financial transactions in the same category. As an example, if a given transaction having Safeway Stores as the payee is manually categorized by a user as "groceries" a first time, the computing system implemented financial management system may propose a category of groceries for all future financial transactions having Safeway Stores as the payee.

Using some currently available computing system implemented financial management systems, the electronic transaction based information, such as payee, payment amount, date, etc. associated with a specific financial transaction is used by the computing system implemented financial management system to propose a category for a specific financial transaction. As an example, if a given transaction has Safeway Stores as the payee, the computing system implemented financial management system may propose a category of "groceries" for the financial transaction based solely on the payee being a grocery store.

In some instances, a proposed categorization of a specific financial transaction is provided based on what category similar transactions are assigned by a defined percentage of all other users of the computing system implemented financial management system. As an example, if a given transaction has Safeway Stores as the payee, the computing system implemented financial management system may propose a category of "groceries" for the financial transaction based solely on the fact that 51% of all other users of the computing system implemented financial management system categorize financial transactions having this payee as groceries 51% of the time.

While the semi-automatic and/or automatic methods of categorization of financial transactions discussed above may help, they are often inaccurate and fail to take into account any meaningful data regarding the user and a financial transaction with respect to the user. For instance, a financial transaction having a payee of "Home Depot" may, for most users of the computing system implemented financial management system, be correctly automatically categorized as a "home repair" expense. However, when the financial transaction is associated with a user who is a professional plumber it is far more likely that the financial transaction should be categorized as a "business expense".

Unfortunately, in most cases, the correction of an incorrect semi-automatic and/or automatic categorization of a given financial transaction takes more user time than it would have taken to manually enter the correct categorization of financial transaction in the first place and, experience has shown that, an average user is far more likely to adopt, and continue to use, any computing system implemented financial management system if the amount of manual data entry, i.e., data entry made via any user interface device, such as a keyboard, a mouse, a touch pad, or any other device that requires input from the user, is minimized. Consequently, it is desirable to eliminate as many incorrect semi-automatic and/or automatic categorizations of financial transactions as is possible for at least this reason. In addition, anytime correction of a semi-automatic and/or automatic categorization of financial transaction is required, there is an opportunity for error introduction. Consequently, for this reason as well, it is highly desirable to minimize incorrect semi-automatic and/or automatic categorizations of financial transactions.

SUMMARY

In accordance with one embodiment, a system and method for automatic categorization of financial transactions includes a process for automatic categorization of financial transactions whereby contributing consumer financial data associated with one or more "contributing consumers" is obtained from one or more sources. In one embodiment, the contributing consumer financial data includes data associated with one or more specific financial transactions. In one embodiment, the contributing consumer financial data is categorized and associated with a specific expense/income category. In one embodiment, one or more contributing consumer attributes associated with one or more of the contributing consumers are identified. In one embodiment, the contributing consumer financial data and the associated categorization data is then analyzed and aggregated, and/or further categorized, according to the one or more contributing consumer attributes and/or the associated categorization data for the contributing consumer financial data. In one embodiment, the aggregated and/or categorized contributing consumer financial data and the associated categorization data is then stored by the process for automatic categorization of financial transactions. In one embodiment, the user financial data representing a user financial transaction is obtained from a "user" for categorization. In one embodiment, one or more specific user attributes are associated with the user.

In one embodiment, the aggregated and/or categorized contributing consumer financial data and the associated categorization data is then searched for contributing consumer financial data and associated categorization data from contributing users sharing at least one of the one or more specific user attributes. In one embodiment, the user financial transaction is then categorized based, at least in part, on the categorization of similar contributing consumer financial transactions by contributing consumers having at least one of the one or more specific user attributes.

In one embodiment, the contributing consumer financial data obtained from one or more contributing consumers is general financial data representing a given contributing consumer's general and/or overall financial status and/or demographics, including, but not limited to: the occupation/profession of the contribution consumer; the contributing consumer's marital status and/or number of dependents; the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's commute; and/or any other data regarding the contributing consumer's general and/or overall financial status desired and/or available. In one embodiment, as discussed below, the contributing consumer's general and/or overall financial status and/or demographics data is used to identify one or more contributing consumer attributes associated with a given contributing consumer, and to categorize their contributing consumer financial data, according to the identified one or more contributing consumer attributes.

In one embodiment, the contributing consumer financial data for one or more contributing consumers includes data regarding specific contributing consumer financial transactions conducted by the contributing consumer including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available, and designated as sharable by the contributing consumer.

In one embodiment, the contributing consumer financial data for one or more contributing consumers is obtained from one or more computing system implemented financial management systems as defined herein, and/or as known in the art the time of filing, and/or as developed after the time of filing.

In one embodiment, the contributing consumers agree to share the contributing consumer financial data with users on a transaction-by-transaction approval basis. In one embodiment, the contributing consumers agree to share the contributing consumer financial data with users on a transaction category approval basis.

In one embodiment, the contributing consumers agree to share the contributing consumer financial data with users without restriction. In other embodiments, the contributing consumers agree to share the contributing consumer financial data with users based on any restrictions/criteria defined by the contributing consumer.

In one embodiment, the contributing consumer financial data to be shared is tagged as sharable by the contributing consumers using a user interface display and a user interface device, such as those defined herein, known in the art, or developed after the time of filing.

In one embodiment, specific contributing consumer financial transaction data is categorized by the contributing consumer and one or more specific contributing consumer financial transactions are associated by the contributing consumer with a specific category, such as utilities, or clothing, or car/gas. In one embodiment, specific contributing consumer financial transaction data is categorized by a computing system implemented financial management system, as defined herein, known at the time of filing, or as developed thereafter. In one embodiment, specific contributing consumer financial transaction data is categorized by the process for automatic categorization of financial transactions and/or the provider of the process for automatic categorization of financial transactions.

In one embodiment, one or more contributing consumer attributes associated with one or more of the contributing consumers are identified, in one embodiment using a given contributing consumer's general and/or overall financial status and/or demographics data discussed above. In one embodiment, the one or more contributing consumer attributes include, but are not limited to: the contributing consumer's occupation/profession; the contributing consumer's marital status and/or number of dependents; whether the contributing consumer is a business owner or an employee; the contributing consumer's marital status and/or number of dependents; the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's commute; and/or any other data regarding the contributing consumer's general and/or overall financial status desired and/or available.

In one embodiment, the contributing consumer financial data and the associated categorization data is then analyzed and aggregated, and/or further categorized, based on the associated categorization data for the contributing consumer financial data and according to the one or more contributing consumer attributes such as, but not limited to: the contributing consumer's occupation/profession; whether the contributing consumer is a business owner or an employee; the contributing consumer's marital status and/or number of dependents; the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's commute; and/or any other data regarding the contributing consumer's general and/or overall financial status desired and/or available.

In one embodiment, the aggregated and/or categorized contributing consumer financial data and the associated categorization data is then stored by the process for automatic categorization of financial transactions in a memory and/or database, as defined herein, known in the art at the time of filing, or as developed after the time of filing.

In one embodiment, the user financial data representing at least one user financial transaction is obtained from a "user" for categorization. In one embodiment, the user financial data includes general financial data representing a given user's general and/or overall financial status and/or demographics, including, but not limited to: the user's occupation/profession; the user's marital status and/or number of dependents; the user's area of residence/zip code; the user's total assets; details regarding one or more of the user's assets, such as the size and location of the user's house; the user's total liabilities/debt; the user's net worth; the user's average discretionary spending; details regarding the user's spending habits and monthly/recurring expenses; the user's age group; various demographic data regarding the user and/or the user's spending; the user's commute; and/or any other data regarding the user's general and/or overall financial status desired and/or available. In one embodiment, as discussed below, the user's general and/or overall financial status and/or demographics data is used to identify one or more user attributes associated with a given user.

In one embodiment, the user financial data includes data regarding one or more specific user financial transactions conducted by the user including, but not limited to: dates of specific financial transactions; payees/payers associated with specific financial transactions; specific items purchased through specific financial transactions; and/or any other data regarding specific financial transactions desired and/or available.

In one embodiment, the user financial data is obtained from one or more computing system implemented financial management systems as defined herein, and/or as known in the art the time of filing, and/or as developed after the time of filing.

In one embodiment, one or more specific user attributes associated with the user are identified, in one embodiment using the user's general and/or overall financial status and/or demographics data discussed above and/or from input provided by the user. In one embodiment, the user attributes include, but are not limited to: the user's occupation/profession; the user's marital status and/or number of dependents; whether the user is a business owner or an employee; the user's marital status and/or number of dependents; the user's area of residence/zip code; the user's total assets; details regarding one or more of the user's assets, such as the size and location of the user's house; the user's total liabilities/debt; the user's net worth; the user's average discretionary spending; details regarding the user's spending habits and monthly/recurring expenses; the user's age group; various demographic data regarding the user and/or the user's spending; the user's commute; and/or any other data regarding the user's general and/or overall financial status desired and/or available.

In one embodiment, the aggregated and/or categorized contributing consumer financial data and the associated categorization data for the contributing consumer financial data is then searched for contributing consumer financial data and associated categorization data from contributing consumers sharing at least one of the one or more specific user attributes. In one embodiment, the user specifies one or more contributing consumer attributes as search parameters and/or other search parameters and/or criteria, such as a request to see all results from specific categories of contributing consumers or from contributing consumers having specific financial and/or demographic attributes.

In one embodiment, the user financial transaction is then categorized based, at least in part, on the categorization of similar contributing consumer financial transactions by contributing consumers having at least one of the one or more specific user attributes associated with the user and/or most closely matching any other user search parameters and/or criteria.

Using the system and method automatic categorization of financial transactions disclosed herein, a user's individual financial transactions can be automatically categorized based, at least in part, on how similar financial transactions are categorized by individuals sharing one or more attributes with the user. Consequently, using the system and method automatic categorization of financial transactions disclosed herein, there is a greater probability of an automatic categorization of a financial transaction being correct, and therefore, fewer incorrect automatic categorizations of financial transactions and less user input to correct incorrect automatic categorizations of financial transactions.

Figure 1:
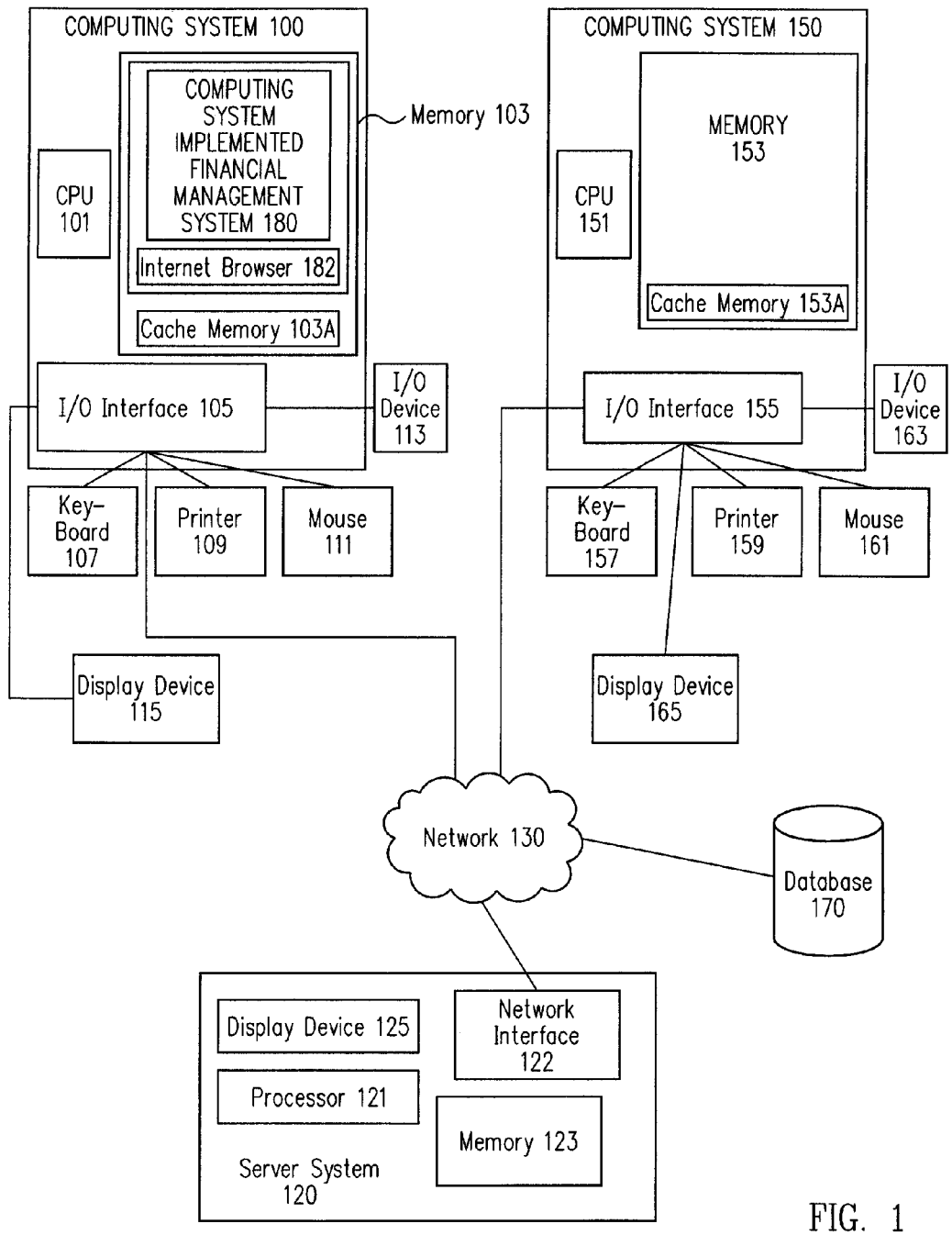
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for automatic categorization of financial transactions includes a process for automatic categorization of financial transactions whereby contributing consumer financial data associated with one or more "contributing consumers" is obtained from one or more sources. In one embodiment, the contributing consumer financial data includes data associated with one or more specific financial transactions. In one embodiment, the contributing consumer financial data is categorized and associated with a specific expense/income category. In one embodiment, one or more contributing consumer attributes associated with one or more of the contributing consumers are identified. In one embodiment, the contributing consumer financial data and the associated categorization data is then analyzed and aggregated, and/or further categorized, according to the one or more contributing consumer attributes and/or the associated categorization data for the contributing consumer financial data. In one embodiment, the aggregated and/or categorized contributing consumer financial data and the associated categorization data is then stored by the process for automatic categorization of financial transactions. In one embodiment, the user financial data representing a user financial transaction is obtained from a "user" for categorization. In one embodiment, one or more specific user attributes are associated with the user. In one embodiment, the aggregated and/or categorized contributing consumer financial data and the associated categorization data is then searched for contributing consumer financial data and associated categorization data from contributing users sharing at least one of the one or more specific user attributes. In one embodiment, the user financial transaction is then categorized based, at least in part, on the categorization of similar contributing consumer financial transactions by contributing consumers having at least one of the one or more specific user attributes.

Hardware System Architecture

FIG. 1 is a block diagram of an exemplary hardware architecture for implementing one embodiment of a system and method for automatic categorization of financial transactions, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for automatic categorization of financial transactions, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for automatic categorization of financial transactions and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by one or more contributing consumers and/or users and used, and/or accessible, by another computing system, such as computing system 150 (discussed below). Computing systems 100 and 150 can be any computing system as defined herein and/or as known in the art at the time of filing and/or as developed thereafter, that includes components that can execute all, or part, of a process for automatic categorization of financial transactions, and/or a computing system implemented financial management system, in accordance with at least one of the embodiments as described herein.

In one embodiment, computing system 100 is used, controlled, and/or accessible by, a provider of and/or a system and process for automatic categorization of financial transactions and data representing all, or part, of financial data associated with one or more contributing consumers is stored in computing system 100, typically in accounts associated with a given contributing consumer. In one embodiment, computing system 100 is used, controlled, and/or accessible by, a provider of and/or a computing system implemented financial management system and data representing all, or part, of financial data associated with one or more contributing consumers is stored in computing system 100, typically in accounts associated with a given contributing consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more users and used, and/or accessible, by another computing system, such as computing system 100. In one embodiment, computing system 150 is used, controlled, and/or accessible by, a provider of and/or a system and process for automatic categorization of financial transactions and data representing all, or part, of data associated with one or more user and/or contributing consumers is stored in computing system 150, typically in accounts associated with a given consumer. In one embodiment, computing system 150 is used, controlled, and/or accessible by, a provider of and/or a computing system implemented financial management system and data representing all, or part, of financial data associated with one or more user and/or contributing consumers is stored in computing system 150, typically in accounts associated with a given consumer.

As discussed in more detail below, in one embodiment, all, or part of, a process for automatic categorization of financial transactions, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a contributing consumer, and/or the contributing consumer's agents, a user, and/or the user's agents, and/or a process for automatic categorization of financial transactions, and/or a computing system implemented financial management system.

In one embodiment, database 170 is used, controlled, and/or accessible by, a provider of and/or a system and process for automatic categorization of financial transactions and data representing all, or part, of financial data associated with one or more contributing consumers is stored in database 170 (FIG. 1). In one embodiment, database 170 is used, controlled, and/or accessible by, a provider of and/or a computing system implemented financial management system and data representing all, or part, of financial data associated with one or more contributing consumers is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for automatic categorization of financial transactions and data representing all, or part, of financial data associated with one or more contributing consumers is stored in server system 120.

In one embodiment, server system 120 is used, controlled, and/or accessible by, a provider of and/or a computing system implemented financial management system and data representing all, or part, of financial data associated with one or more contributing consumers is stored in server system 120.

Network 130 can be any network or network system as defined herein, known in the art at the time of filing, and/or as developed after the time of filing, capable of allowing communication between two or more computing systems.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for automatic categorization of financial transactions, and/or a computing system implemented financial management system, and/or financial data associated with one or more contributing consumers, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for automatic categorization of financial transactions, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for automatic categorization of financial transactions and/or a computing system implemented financial management system are capable of being called from an application or the operating system. In one embodiment, an application, process, or program is generally defined to be any executable code.

Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for automatic categorization of financial transactions, and/or a computing system implemented financial management system, and/or financial data associated with one or more contributing consumers, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "contributing consumer", denotes any party and/or entity for whom, or from whom, contributing consumer financial data is obtained by a process for automatic categorization of financial transactions, and/or a person and/or entity for whom, or from whom, contributing consumer financial data is obtained by a process for automatic categorization of financial transactions, and/or a legal guardian of person and/or entity for whom, or from whom, contributing consumer financial data is obtained by a process for automatic categorization of financial transactions, and/or an authorized agent of any party and/or person and/or entity for whom, or from whom, contributing consumer financial data is obtained by a process for automatic categorization of financial transactions.

Herein, the term "user" and "user consumer" are used interchangeably to denote any party and/or entity that interfaces with, and/or to whom information is provided by, a process for automatic categorization of financial transactions, and/or a person and/or entity that interfaces with, and/or to whom information is provided by, a process for automatic categorization of financial transactions, and/or a legal guardian of person and/or entity that interfaces with, and/or to whom information is provided by, a process for automatic categorization of financial transactions, and/or an authorized agent of any party and/or person and/or entity that interfaces with, and/or to whom information is provided by, a process for automatic categorization of financial transactions.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, implemented by individuals, entities, businesses, financial institutions, such as banks, credit card companies and investment companies, whether known at the time of filling or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for automatic categorization of financial transactions includes a process for automatic categorization of financial transactions whereby contributing consumer financial data associated with one or more "contributing consumers" is obtained from one or more sources. In one embodiment, the contributing consumer financial data includes data associated with one or more specific financial transactions. In one embodiment, the contributing consumer financial data is categorized and associated with a specific expense/income category. In one embodiment, one or more contributing consumer attributes associated with one or more of the contributing consumers are identified. In one embodiment, the contributing consumer financial data and the associated categorization data is then analyzed and aggregated, and/or further categorized, according to the one or more contributing consumer attributes and/or the associated categorization data for the contributing consumer financial data. In one embodiment, the aggregated and/or categorized contributing consumer financial data and the associated categorization data is then stored by the process for automatic categorization of financial transactions. In one embodiment, the user financial data representing a user financial transaction is obtained from a "user" for categorization. In one embodiment, one or more specific user attributes are associated with the user. In one embodiment, the aggregated and/or categorized contributing consumer financial data and the associated categorization data is then searched for contributing consumer financial data and associated categorization data from contributing users sharing at least one of the one or more specific user attributes. In one embodiment, the user financial transaction is then categorized based, at least in part, on the categorization of similar contributing consumer financial transactions by contributing consumers having at least one of the one or more specific user attributes.

Figure 2:
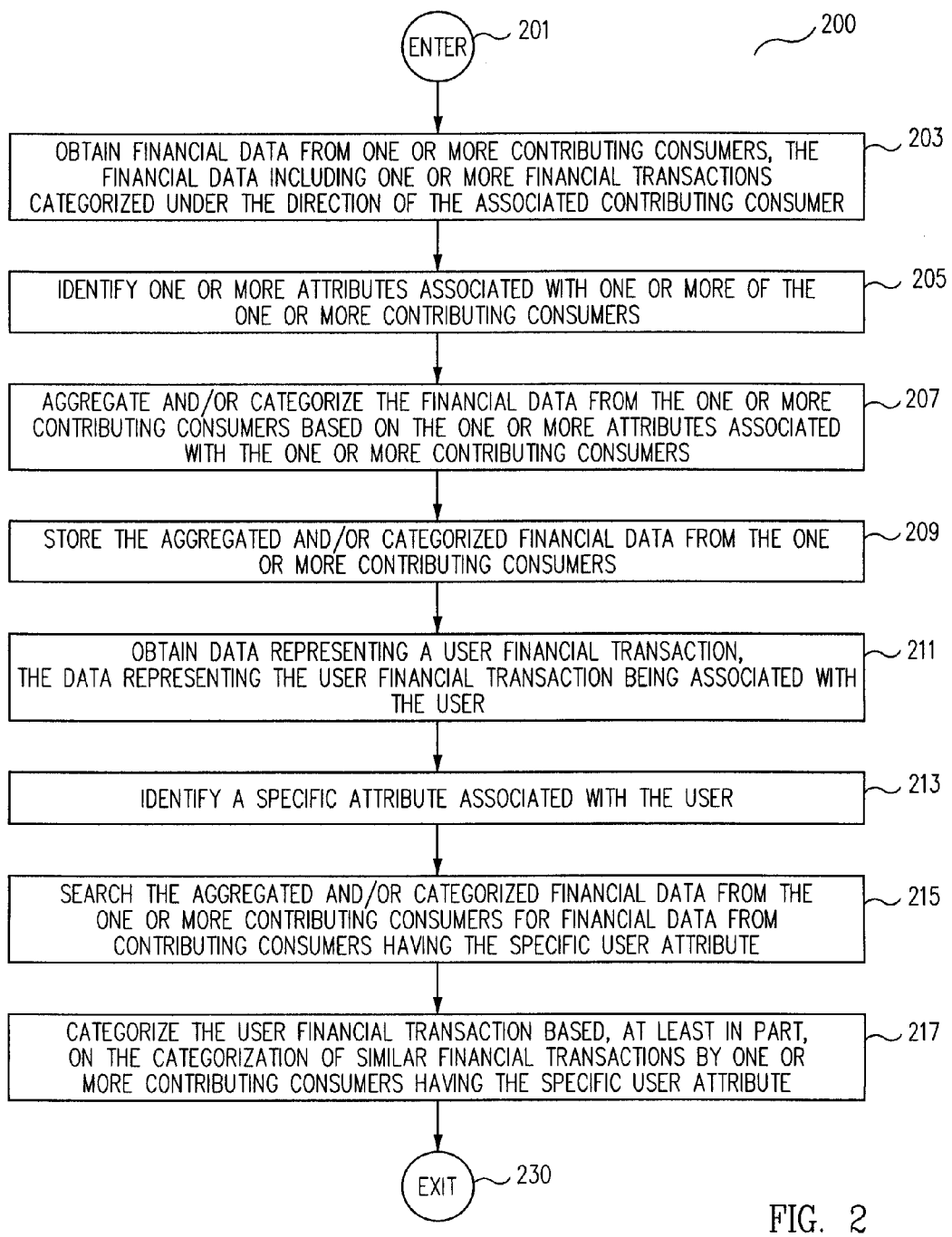
FIG. 2 is a flow chart depicting a process for automatic categorization of financial transactions in accordance with one embodiment.

FIG. 2 is a flow chart depicting a process for automatic categorization of financial transactions 200 in accordance with one embodiment. Process for automatic categorization of financial transactions 200 begins at ENTER OPERATION 201 of FIG. 2 and process flow proceeds to OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 financial data associated with one or more "contributing consumers", herein also referred to as "contributing consumer financial data", is obtained from one or more sources.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumers agree to share the contributing consumer financial data with other "users" by any one of various means, including, tagging specific financial data as sharable data. In one embodiment, the contributing consumer financial data includes data associated with specific contributing consumer financial transactions and, in one embodiment, the specific contributing consumer financial transactions are tagged as sharable by the contributing consumers. In one embodiment, the specific contributing consumer financial transactions are categorized by the contributing consumers and/or associated with a specific type of expense/income.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203, the contributing consumer financial data obtained from one or more contributing consumers includes general financial data obtained from the contributing consumer representing a given contributing consumer's general and/or overall financial status and/or demographics, including, but not limited to: the contributing consumer's occupation/profession; the status of a the contributing consumer as a business owner/operator or an employee; the contributing consumer's marital status and/or number of dependents; the contributing consumer's area of residence/zip code; the contributing consumer's total assets; details regarding one or more of the contributing consumer's assets, such as the size and location of the contributing consumer's house and/or the type of car the contributing consumer drives; the contributing consumer's total income and/or the percentage of the contributing consumer's income spent in a given category of financial data; the contributing consumer's net worth; the contributing consumer's average discretionary spending and/or the percentage of the contributing consumer's discretionary spending spent in a given category of contributing consumer financial data; the contributing consumer's age group; various demographic data regarding the contributing consumer and/or the contributing consumer's spending; the contributing consumer's commute; the contributing consumer's yearly mileage; and/or any other data regarding the contributing consumer's general and/or overall financial status desired and/or available.

In one embodiment, as discussed below, the contributing consumer's general and/or overall financial status and/or demographics data is used to identify one or more contributing consumer attributes associated with a given contributing consumer, and to categorize their contributing consumer financial data, according to the identified one or more contributing consumer attributes, so that, in one embodiment, process for automatic categorization of financial transactions 200 can find contributing consumer financial data from contributing consumers similarly situated, i.e., with shared attributes, with respect to a given user. In one embodiment, as discussed below, the contributing consumer's general and/or overall financial status and/or demographics data is used to categorize and/or identify contributing consumers, and their contributing consumer financial data, according to various criteria/parameters so that a user can narrow search results to results from specific "types" of contributing consumers.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumer financial data associated with one or more contributing consumers represents one or more contributing consumer financial transactions conducted by a given contributing consumer. In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumer financial data representing various contributing consumer financial transactions conducted by the contributing consumer includes, but is not limited to, data representing: dates of specific contributing consumer financial transactions; payees/payers associated with specific contributing consumer financial transactions; categories of specific contributing consumer financial transactions, such as the expense category assigned to a given specific contributing consumer financial transaction; total expenditures in specific contributing consumer financial transaction categories over designated time frames; specific items purchased through specific contributing consumer financial transactions; the geographic location of specific contributing consumer financial transactions; the geographic location where one or more services and/or products associated with specific contributing consumer financial transactions are used/delivered; and/or any other data regarding specific contributing consumer financial transactions desired and/or available.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 at least part of the contributing consumer financial data associated with one or more contributing consumers is obtained by process for automatic categorization of financial transactions 200 using, and/or through, and/or from, a computing system implemented financial management system.

In one embodiment, the contributing consumer financial data associated with one or more contributing consumers obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 includes data associated with contributing consumer financial transactions conducted using multiple payment methods and/or accounts to provide as complete a set of contributing consumer financial data as possible. For instance, in one embodiment, the contributing consumer financial data associated with one or more contributing consumers is obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a contributing consumer to pay for and/or conduct contributing consumer financial transactions.

In addition, in some embodiments, the contributing consumer financial data associated with one or more contributing consumers obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 is obtained from multiple sources of the same type. For instance, in one embodiment, the contributing consumer financial data associated with one or more contributing consumers is obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a contributing consumer to pay for and/or conduct contributing consumer financial transactions.

As noted above, in one embodiment, all, or part, of the contributing consumer financial data associated with one or more contributing consumers is obtained by process for automatic categorization of financial transactions 200 at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from, or using, a computing system implemented financial management system, such as computing system implemented financial management system 180 (FIG. 1), that implements, includes, is accessed by, and/or is otherwise associated with process for automatic categorization of financial transactions 200 (FIG. 2).

Currently, various computing system implemented financial management systems are available and implemented by individuals, businesses, financial institutions, such as banks, credit card companies and investment companies, as discussed herein. Computing system implemented financial management systems typically help users/contributing consumers manage their finances by providing a centralized interface with banks, credit card companies, and other various financial institutions and/or accounts, for identifying, processing, storing, and categorizing contributing consumer financial transactions and other contributing consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, user defined category of the financial transaction, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, associated with one or more particular products and/or services, and/or with one or more particular payees, and/or one or more specific events.

In one embodiment, the contributing consumer financial data associated with one or more contributing consumers obtained using one or more computing system implemented financial management systems is transferred, or otherwise made available to, process for automatic categorization of financial transactions 200 at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203.

In one embodiment, all, or part, of the contributing consumer financial data associated with one or more contributing consumers is obtained by process for automatic categorization of financial transactions 200 at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from invoices/bills and/or receipt data provided to process for automatic categorization of financial transactions 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for automatic categorization of financial transactions 200 is associated with a computing system implemented financial management system, such as computing system implemented financial management system 180 of FIG. 1, that implements, includes, is accessed by, and/or is otherwise associated with process for automatic categorization of financial transactions 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for automatic categorization of financial transactions 200 in one of numerous locations by one of numerous methods known to those of skill in the art and/or as discussed herein.

In one embodiment, all, or part, of the contributing consumer financial data associated with one or more contributing consumers is obtained by process for automatic categorization of financial transactions 200, and/or a computing system implemented financial management system, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct contributing consumer financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct contributing consumer financial transactions.

In one embodiment, all, or part, of the contributing consumer financial data associated with one or more contributing consumers is obtained by process for automatic categorization of financial transactions 200 at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from contributing consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the contributing consumer financial data associated with one or more contributing consumers is obtained by process for automatic categorization of financial transactions 200 at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 from any combination of the above sources and/or from any other source of contributing consumer financial data associated with one or more contributing consumers whether known at the time of filing or as developed thereafter.

As noted above, in one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumers agree to share all or part of their contributing consumer financial data with process for automatic categorization of financial transactions 200 and "users" by any one of various means, including, tagging specific financial data as sharable data.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumers agree to share the contributing consumer financial data with users on a transaction-by-transaction approval basis. In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203, the contributing consumers agree to share the contributing consumer financial data with users on a financial data category approval basis. In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumers agree to share the contributing consumer financial data with users without restriction. In other embodiments, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 the contributing consumers agree to share the contributing consumer financial data with users based on any restrictions/criteria dictated by the contributing consumer.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203, the contributing consumer financial data to be shared is tagged as sharable by the contributing consumers using a user interface display and a user interface device, such as those defined herein, known in the art, or developed after the time of filing.

In one embodiment, at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203, specific contributing consumer financial transaction data is assigned a category/name and/or a description by the contributing consumer and one or more specific contributing consumer financial transactions are associated by the contributing consumer with a specific type of expense, such as utilities, or home maintenance, or transportation.

In one embodiment, specific contributing consumer financial transaction data is categorized by a computing system implemented financial management system, as defined herein, known at the time of filing, or as developed thereafter. In one embodiment, specific contributing consumer financial transaction data is categorized by process for automatic categorization of financial transactions 200 and/or the provider of process for automatic categorization of financial transactions 200.

In one embodiment once financial data associated with one or more "contributing consumers", is obtained from one or more sources at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203, process flow proceeds to IDENTIFY ONE OR MORE ATTRIBUTES ASSOCIATED WITH ONE OR MORE OF THE ONE OR MORE CONTRIBUTING CONSUMERS OPERATION 205.

In one embodiment, at IDENTIFY ONE OR MORE ATTRIBUTES ASSOCIATED WITH ONE OR MORE OF THE ONE OR MORE CONTRIBUTING CONSUMERS OPERATION 205 one or more contributing consumer attributes associated with one or more of the contributing consumers are identified, in one embodiment using a given contributing consumer's general and/or overall financial status and/or demographics data obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203.

In one embodiment, the one or more contributing consumer attributes associated with one or more of the contributing consumers identified at IDENTIFY ONE OR MORE ATTRIBUTES ASSOCIATED WITH ONE OR MORE OF THE ONE OR MORE CONTRIBUTING CONSUMERS OPERATION 205 include, but are not limited to: the contributing consumer's occupation/profession; whether the contributing consumer is a business owner/operator or an employee; the contributing consumer's marital status and/or number of dependents; the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's commute; and/or any other data regarding the contributing consumer's general and/or overall financial status desired and/or available.

As noted, in one embodiment, the one or more contributing consumer attributes associated with one or more of the contributing consumers are identified using a given contributing consumer's general and/or overall financial status and/or demographics data obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203. In one embodiment, the one or more contributing consumer attributes associated with one or more of the contributing consumers are identified/provided by the contributing consumer themselves, in one embodiment, using a user interface device such as those discussed herein, known in the art at the time of filing, or as developed thereafter.

As a specific illustrative example, using one embodiment of a process for automatic categorization of financial transactions 200, an exemplary contributing consumer is identified by process for automatic categorization of financial transactions 200 at IDENTIFY ONE OR MORE ATTRIBUTES ASSOCIATED WITH ONE OR MORE OF THE ONE OR MORE CONTRIBUTING CONSUMERS OPERATION 205 as a professional plumber owning and operating his own business in San Jose Calif. In one embodiment, theses contributing consumer attributes are identified based on both the contributing consumer's input and the contributing consumer's general and/or overall financial status and/or demographics data obtained at OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203.

In one embodiment, once one or more contributing consumer attributes associated with one or more of the contributing consumers are identified at IDENTIFY ONE OR MORE ATTRIBUTES ASSOCIATED WITH ONE OR MORE OF THE ONE OR MORE CONTRIBUTING CONSUMERS OPERATION 205, process flow proceeds to AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207.

In one embodiment, at AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 the contributing consumer financial data and the associated categorization data of OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 is analyzed and aggregated, and/or further categorized, according to the associated categorization data for the contributing consumer financial data and the one or more contributing consumer attributes of IDENTIFY ONE OR MORE ATTRIBUTES ASSOCIATED WITH ONE OR MORE OF THE ONE OR MORE CONTRIBUTING CONSUMERS OPERATION 205.

In one embodiment, at AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 the contributing consumer financial data and the associated categorization data is analyzed and aggregated, and/or further categorized, based on the associated categorization data for the contributing consumer financial data of OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 and according to the one or more contributing consumer attributes of IDENTIFY ONE OR MORE ATTRIBUTES ASSOCIATED WITH ONE OR MORE OF THE ONE OR MORE CONTRIBUTING CONSUMERS OPERATION 205 such as, but not limited to: the contributing consumer's occupation/profession; whether the contributing consumer is a business owner/operator or an employee; the contributing consumer's marital status and/or number of dependents; the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's commute; and/or any other data regarding the contributing consumer's general and/or overall financial status desired and/or available.

Methods, means, processes, procedures and mechanisms for analyzing, aggregating, and categorizing data according to various parameters/criteria are well known in the art. Consequently, a more detailed discussion of any specific methods, means, processes, procedures and mechanisms for analyzing, aggregating, and categorizing data, such as, in one embodiment, is performed at AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207, is omitted here to avoid detracting from the invention.

As one specific example, continuing with the example of the professional plumber in San Jose introduced above, using one embodiment of a process for automatic categorization of financial transactions 200, at AGGREGATE AND/OR CAT- EGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207, the contributing consumer financial data associated with the professional plumber in San Jose is aggregated with contributing consumer financial data associated with other professional plumbers. In another embodiment, the contributing consumer financial data associated with the professional plumber in San Jose is aggregated with contributing consumer financial data associated with other small business owners in California. In another embodiment, the contributing consumer financial data associated with the professional plumber in San Jose is aggregated with contributing consumer financial data associated with contributing consumers having any combination of these attributes and/or any other identified attributes of interest.

In one embodiment, once the contributing consumer financial data and the associated categorization data of OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 is analyzed and aggregated, and/or further categorized, according to the associated categorization data for the contributing consumer financial data and the one or more contributing consumer attributes of IDENTIFY ONE OR MORE ATTRIBUTES ASSOCIATED WITH ONE OR MORE OF THE ONE OR MORE CONTRIBUTING CONSUMERS OPERATION 205 at AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207, process flow proceeds to STORE THE AGGREGATED AND/OR CATEGORIZED FINANCIAL DATA FROM THE ONE OR MORE CONTRIBUTING CONSUMERS OPERATION 209.

In one embodiment, at STORE THE AGGREGATED AND/OR CATEGORIZED FINANCIAL DATA FROM THE ONE OR MORE CONTRIBUTING CONSUMERS OPERATION 209, the aggregated and/or categorized contributing consumer financial data and the associated categorization data of AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 is stored by, or under the control of, process for automatic categorization of financial transactions 200.

In one embodiment, at STORE THE AGGREGATED AND/OR CATEGORIZED FINANCIAL DATA FROM THE ONE OR MORE CONTRIBUTING CONSUMERS OPERATION 209, the aggregated and/or categorized contributing consumer financial data and the associated categorization data is stored in whole, or in part, in a database maintained by, accessible by, owned by, or otherwise related to: process for automatic categorization of financial transactions 200, and/or a provider of process for automatic categorization of financial transactions 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the aggregated and/or categorized contributing consumer financial data and the associated categorization data stored as described above is maintained, in whole, or in part, by: process for automatic categorization of financial transactions 200, and/or a provider of process for automatic categorization of financial transactions 200; a computing system implemented financial management system, and/or a provider of a computing system implemented financial management system; a third party data storage institution; any third party service or institution; or any other parties. In one embodiment, access to the aggregated and/or categorized contributing consumer financial data and the associated categorization data is provided to process for automatic categorization of financial transactions 200, and/or a computing system implemented financial management system, by providing access to the data and/or providing the data on a computer program product.

In one embodiment, once the aggregated and/or categorized contributing consumer financial data and the associated categorization data of AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 is stored by, or under the control of, process for automatic categorization of financial transactions 200 at STORE THE AGGREGATED AND/OR CATEGORIZED FINANCIAL DATA FROM THE ONE OR MORE CONTRIBUTING CONSUMERS OPERATION 209, process flow proceeds to OBTAIN DATA REPRESENTING A USER FINANCIAL TRANSACTION, THE DATA REPRESENTING THE USER FINANCIAL TRANSACTION BEING ASSOCIATED WITH THE USER OPERATION 211.

In one embodiment, at OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 user financial data representing a user financial transaction is obtained from a "user" for categorization.

In one embodiment, the user financial data includes general financial data representing a given user's general and/or overall financial status and/or demographics, including, but not limited to: the user's occupation/profession; whether the user is a business owner/operator or an employee; the user's marital status and/or number of dependents; the user's area of residence/zip code; the user's total assets; details regarding one or more of the user's assets, such as the size and location of the user's house; the user's total liabilities/debt; the user's net worth; the user's average discretionary spending; details regarding the user's spending habits and monthly/recurring expenses; the user's age group; various demographic data regarding the user and/or the user's spending; the user's commute; and/or any other data regarding the user's general and/or overall financial status desired and/or available. In one embodiment, as discussed below, the user's general and/or overall financial status and/or demographics data is used to identify one or more user attributes associated with a given user.

In one embodiment, the user financial data includes data regarding at least one specific user financial transactions conducted by the user including, but not limited to: dates of specific financial transactions; payees/payers associated with specific financial transactions; specific items purchased through specific financial transactions; and/or any other data regarding specific financial transactions desired and/or available.

In one embodiment, the user financial data is obtained from one or more computing system implemented financial management systems as defined herein, and/or as known in the art the time of filing, and/or as developed after the time of filing.

In one embodiment, the user financial data is obtained from any source of user financial data including, but not limited to, the sources and means for obtaining contributing consumer financial data discussed above with respect to OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 and/or any other source of user financial data known in the art at the tine of filing, or as developed thereafter.

Continuing with the specific illustrative example introduced above, using one embodiment of a process for automatic categorization of financial transactions 200, user financial data associated with a given user is obtained at OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 and indicates a financial transaction of $2500.00 in which the payee is identified as "Home Depot".

In one embodiment, once user financial data representing a user financial transaction is obtained for categorization at OBTAIN DATA REPRESENTING A USER FINANCIAL TRANSACTION, THE DATA REPRESENTING THE USER FINANCIAL TRANSACTION BEING ASSOCIATED WITH THE USER OPERATION 211, process flow proceeds to IDENTIFY A SPECIFIC ATTRIBUTE ASSOCIATED WITH THE USER OPERATION 213.

In one embodiment, at IDENTIFY A SPECIFIC ATTRIBUTE ASSOCIATED WITH THE USER OPERATION 213 one or more specific user attributes are associated with the user of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211.

In one embodiment, at IDENTIFY A SPECIFIC ATTRIBUTE ASSOCIATED WITH THE USER OPERATION 213 one or more specific user attributes associated with the user are identified, in one embodiment, using the user's general and/or overall financial status and/or demographics data of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 and/or from input provided by the user. In one embodiment, the user attributes include, but are not limited to: the user's occupation/profession; whether the user is a business owner/operator or an employee; the user's marital status and/or number of dependents; the user's area of residence/zip code; the user's total assets; details regarding one or more of the user's assets, such as the size and location of the user's house; the user's total liabilities/debt; the user's net worth; the user's average discretionary spending; details regarding the user's spending habits and monthly/recurring expenses; the user's age group; various demographic data regarding the user and/or the user's spending; the user's commute; and/or any other data regarding the user's general and/or overall financial status desired and/or available.

As noted, in one embodiment, the one or more user attributes associated with the user are identified using a given user's general and/or overall financial status and/or demographics data obtained at OBTAIN DATA REPRESENTING A USER FINANCIAL TRANSACTION, THE DATA REPRESENTING THE USER FINANCIAL TRANSACTION BEING ASSOCIATED WITH THE USER OPERATION 211. In one embodiment, the user attributes associated with the user are identified/provided by the user themselves, in one embodiment, using a user interface device such as those discussed herein, known in the art at the time of filing, or as developed thereafter.

Continuing with the specific illustrative example introduced above, using one embodiment of a process for automatic categorization of financial transactions 200, the given user having the financial transaction of $2500.00 in which the payee is identified as "Home Depot" is identified by process for automatic categorization of financial transactions 200 at IDENTIFY A SPECIFIC ATTRIBUTE ASSOCIATED WITH THE USER OPERATION 213 as having the user attribute of being a professional plumber located in San Diego, Calif.

In one embodiment, once one or more specific user attributes are associated with the user of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 at IDENTIFY A SPECIFIC ATTRIBUTE ASSOCIATED WITH THE USER OPERATION 213, process flow proceeds to SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215.

In one embodiment, at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215 the aggregated and/or categorized contributing consumer financial data and the associated categorization data of AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 and STORE THE AGGREGATED AND/OR CATEGORIZED FINANCIAL DATA FROM THE ONE OR MORE CONTRIBUTING CONSUMERS OPERATION 209 is searched for contributing consumer financial data and associated categorization data from contributing users sharing at least one of the one or more specific user attributes of IDENTIFY A SPECIFIC ATTRIBUTE ASSOCIATED WITH THE USER OPERATION 213.

Recall that, in one embodiment, at IDENTIFY ONE OR MORE ATTRIBUTES ASSOCIATED WITH ONE OR MORE OF THE ONE OR MORE CONTRIBUTING CONSUMERS OPERATION 205, the contributing consumer's general and/or overall financial status and/or demographics data was obtained and at AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 the contributing consumer financial data and the associated categorization data of OBTAIN FINANCIAL DATA FROM ONE OR MORE CONTRIBUTING CONSUMERS, THE FINANCIAL DATA INCLUDING ONE OR MORE FINANCIAL TRANSACTIONS CATEGORIZED UNDER THE DIRECTION OF THE ASSOCIATED CONTRIBUTING CONSUMER OPERATION 203 is analyzed and aggregated, and/or further categorized, according to the associated categorization data for the contributing consumer financial data and the one or more contributing consumer attributes of IDENTIFY ONE OR MORE ATTRIBUTES ASSOCIATED WITH ONE OR MORE OF THE ONE OR MORE CONTRIBUTING CONSUMERS OPERATION 205.

Further recall that at IDENTIFY A SPECIFIC ATTRIBUTE ASSOCIATED WITH THE USER OPERATION 213 one or more specific user attributes are associated with the user of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211.

In one embodiment, at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215 the data from IDENTIFY ONE OR MORE ATTRIBUTES ASSOCIATED WITH ONE OR MORE OF THE ONE OR MORE CONTRIBUTING CONSUMERS OPERATION 205 and IDENTIFY A SPECIFIC ATTRIBUTE ASSOCIATED WITH THE USER OPERATION 213 is used to match contributing consumers and users having common attributes and then obtain the contributing consumer financial data and associated categorization data from contributing users having at least one of the one or more specific user attributes of IDENTIFY A SPECIFIC ATTRIBUTE ASSOCIATED WITH THE USER OPERATION 213.

Numerous, methods, means, mechanisms, processes and/or procedures for analyzing and/or searching data in response to various search criteria/parameters are well known to those of skill in the art. Consequently, a more detailed discussion of methods, means, mechanisms, processes and/or procedures for analyzing and/or searching data in response to various search criteria/parameters, such as the analysis/search performed, in one embodiment, at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215, is omitted here to avoid detracting from the invention.

Continuing with the specific illustrative example introduced above, recall that using one embodiment of a process for automatic categorization of financial transactions 200, the given user having the financial transaction of $2500.00 in which the payee is identified as "Home Depot" and whose is identified by process for automatic categorization of financial transactions 200 at IDENTIFY A SPECIFIC ATTRIBUTE ASSOCIATED WITH THE USER OPERATION 213 as having the user attribute of being a professional plumber located in San Diego, Calif. In one example of one embodiment, at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215 the aggregated and categorized contributing consumer financial data and the associated categorization data of AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 is searched for the contributing consumer financial data and the associated categorization data from contributing consumers having the attribute of being professional plumbers in common with the user. In one embodiment, all available contributing consumer financial data and the associated categorization data from contributing consumers having the attribute of being professional plumbers in common with the user is collected at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215.

In one embodiment, once the data from IDENTIFY ONE OR MORE ATTRIBUTES ASSOCIATED WITH ONE OR MORE OF THE ONE OR MORE CONTRIBUTING CONSUMERS OPERATION 205 and IDENTIFY A SPECIFIC ATTRIBUTE ASSOCIATED WITH THE USER OPERATION 213 is used to match contributing consumers and users having common attributes and then obtain the contributing consumer financial data and associated categorization data from contributing users having at least one of the one or more specific user attributes of IDENTIFY A SPECIFIC ATTRIBUTE ASSOCIATED WITH THE USER OPERATION 213 at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215, process flow proceeds to CATEGORIZE THE USER FINANCIAL TRANSACTION BASED, AT LEAST IN PART, ON THE CATEGORIZATION OF SIMILAR FINANCIAL TRANSACTIONS BY ONE OR MORE CONTRIBUTING CONSUMERS HAVING THE SPECIFIC USER ATTRIBUTE OPERATION 217.

In one embodiment, at CATEGORIZE THE USER FINANCIAL TRANSACTION BASED, AT LEAST IN PART, ON THE CATEGORIZATION OF SIMILAR FINANCIAL TRANSACTIONS BY ONE OR MORE CONTRIBUTING CONSUMERS HAVING THE SPECIFIC USER ATTRIBUTE OPERATION 217, the user financial transaction of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 is categorized based, at least in part, on the categorization of similar contributing consumer financial transactions by the contributing consumers having at least one of the one or more specific user attributes of SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215.

In one embodiment, at CATEGORIZE THE USER FINANCIAL TRANSACTION BASED, AT LEAST IN PART, ON THE CATEGORIZATION OF SIMILAR FINANCIAL TRANSACTIONS BY ONE OR MORE CONTRIBUTING CONSUMERS HAVING THE SPECIFIC USER ATTRIBUTE OPERATION 217, the user financial transaction of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 is categorized based, at least in part, on the categorization of similar contributing consumer financial transactions by contributing consumers having at least one of the one or more specific user attributes associated with the user and/or most closely matching any other user search parameters and/or criteria of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211.

Continuing with the specific illustrative example introduced above, recall that using one embodiment of a process for automatic categorization of financial transactions 200, the given user having the financial transaction of $2500.00 in which the payee is identified as "Home Depot" is identified by process for automatic categorization of financial transactions 200 at IDENTIFY A SPECIFIC ATTRIBUTE ASSOCIATED WITH THE USER OPERATION 213 as having the user attribute of being a professional plumber located in San Diego, Calif.

Further recall that, in one example of one embodiment, at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215 the aggregated and categorized contributing consumer financial data and the associated categorization data of AGGREGATE AND/OR CATEGORIZE THE FINANCIAL DATA FROM THE ONE OR MORE CONTRIBUTING CONSUMERS BASED ON THE ONE OR MORE ATTRIBUTES ASSOCIATED WITH THE ONE OR MORE CONTRIBUTING CONSUMERS OPERATION 207 is searched for the contributing consumer financial data and the associated categorization data from contributing consumers having the attribute of being professional plumbers in common with the user.

Continuing with this example, in one embodiment, all available contributing consumer financial data and the associated categorization data from contributing consumers having the attribute of being professional plumbers in common with the user collected at SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215 indicates that, for contributing consumers that are professional plumbers, over 90% of all transactions having a payee of "Home Depot" are categorized by the contributing consumers that are professional plumbers as a "business expense". Consequently, in this specific example, using one embodiment of process for automatic categorization of financial transactions 200, the given financial transaction of $2500.00 in which the payee is identified as "Home Depot" is categorized as a "business expense". It is notable that, absent the filter provided by the contributing consumer attribute of professional plumber provided by process for automatic categorization of financial transactions 200 in this specific example, the automatic categorization would have been based on data from all users of the computing system implemented financial management system and the given financial transaction of $2500.00 in which the payee is identified as "Home Depot" would be incorrectly categorized as a "home repair" expense.

In one embodiment, once the user financial transaction of OBTAIN DATA REPRESENTING A USER FINANCIAL TRANSACTION, THE DATA REPRESENTING THE USER FINANCIAL TRANSACTION BEING ASSOCIATED WITH THE USER OPERATION 211 is categorized based, at least in part, on the categorization of similar contributing consumer financial transactions by the contributing consumers having at least one of the one or more specific user attributes of SEARCH THE AGGREGATED AND/OR CATEGORIZED FINANCIAL DATA FROM THE ONE OR MORE CONTRIBUTING CONSUMERS FOR FINANCIAL DATA FROM CONTRIBUTING CONSUMERS HAVING THE SPECIFIC USER ATTRIBUTE OPERATION 215 at CATEGORIZE THE USER FINANCIAL TRANSACTION BASED, AT LEAST IN PART, ON THE CATEGORIZATION OF SIMILAR FINANCIAL TRANSACTIONS BY ONE OR MORE CONTRIBUTING CONSUMERS HAVING THE SPECIFIC USER ATTRIBUTE OPERATION 217, process flow proceeds to EXIT OPERATION 230. In one embodiment, at EXIT OPERATION 230, process for automatic categorization of financial transactions 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for automatic categorization of financial transactions 200, a user's individual financial transactions can be automatically categorized based, at least in part, on how similar financial transactions are categorized by individuals sharing one or more attributes with the user. Consequently, using process for automatic categorization of financial transactions 200, there is a greater probability of an automatic categorization of a financial transaction being correct, and therefore, fewer incorrect automatic categorizations of financial transactions and less user input to correct incorrect automatic categorizations of financial transactions.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "obtaining", "identifying", "associating", "aggregating"; "initiating"; "collecting", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A system for automatic categorization of financial transactions comprising:
   a processor; and
   a memory coupled to the processor, the memory having instructions stored therein which when executed by a processor perform a process for automatic categorization of financial transactions comprising:
   obtaining contributing consumer financial data from one or more contributing consumers, the contributing consumer financial data comprising data representing one or more contributing consumer financial transactions, the contributing consumer financial transactions being categorized according to the desires of the associated contributing consumer;
   identifying one or more contributing consumer attributes associated with one or more of the one or more contributing consumers, wherein the one or more contributing consumer attributes are distinct from and thus additional to the one or more contributing consumer financial transactions, wherein the process is operable to consider contributing consumer attributes comprising the contributing consumer's occupation/profession, the contributing consumer's marital status and number of dependents, whether the contributing consumer is a business owner or an employee, the contributing consumer's zip code, the contributing consumer's total assets, the size and location of the contributing consumer's house, the contributing consumer's total liabilities/debt, the contributing consumer's net worth, the contributing consumer's average discretionary spending, one or more details regarding the contributing consumer's spending habits or recurring expenses, the contributing consumer's age group, and one or more pieces of demographic data regarding the contributing consumer;

aggregating and categorizing the contributing consumer financial data based, at least in part, on the one or more contributing consumer attributes of the one or more of the one or more contributing consumers associated with the contributing consumer financial data;

obtaining user financial data, the user financial data being associated with a user, the user financial data comprising data representing at least one user financial transaction;

identifying at least one user attribute associated with the user, wherein the at least one user attribute is distinct from and thus additional to the at least one user financial transaction, wherein the process is operable to consider user attributes comprising the user's occupation/profession, the user's marital status and number of dependents, whether the user is a business owner or an employee, the user's zip code, the user's total assets, the size and location of the user's house, the user's total liabilities/debt, the user's net worth, the user's average discretionary spending, one or more details regarding the user's spending habits or recurring expenses, the user's age group, and one or more pieces of demographic data regarding the user;

searching the aggregated and/or categorized contributing consumer financial data for contributing consumer financial data and associated categorization data from contributing consumers having at least one contributing consumer attribute that is the at least one user attribute; and categorizing the at least one user financial transaction based, at least in part, on the categorization of similar contributing consumer financial transactions by contributing consumers having at least one contributing consumer attribute that is the at least one user attribute.

2. The system for automatic categorization of financial transactions of claim 1, wherein;
obtaining contributing consumer financial data from one or more contributing consumers comprises:
obtaining contributing consumer financial data from the one or more contributing consumers that is designated by the one or more contributing consumers as sharable contributing consumer financial data.

3. The system for automatic categorization of financial transactions of claim 1, wherein;
obtaining contributing consumer financial data from one or more contributing consumers comprises:
obtaining contributing consumer financial data from the one or more contributing consumers from a computing system implemented financial management system.

4. The system for automatic categorization of financial transactions of claim 3, wherein;
the contributing consumer financial transactions are categorized according to the desires of the associated contributing consumer by the computing system implemented financial management system.

5. The system for automatic categorization of financial transactions of claim 1, wherein;
aggregating and categorizing the contributing consumer financial data based, at least in part, on the one or more contributing consumer attributes of the one or more of the one or more contributing consumers associated with the contributing consumer financial data comprises aggregating and categorizing the contributing consumer financial data based on the one or more contributing consumer attributes of the one or more of the one or more contributing consumers associated with the contributing consumer financial data and the categorization of the financial transactions made according to the desires of the associated contributing consumer.

6. The system for automatic categorization of financial transactions of claim 1, wherein;
obtaining user financial data, the user financial data comprising data representing at least one user financial transaction comprises obtaining the user financial data from a computing system implemented financial management system.

7. A computer program product for providing a process for automatic categorization of financial transactions comprising:
a nontransitory computer readable medium;
and computer program code, encoded on the computer readable medium, comprising computer readable instructions for:
obtaining contributing consumer financial data from one or more contributing consumers, the contributing consumer financial data comprising data representing one or more contributing consumer financial transactions, the contributing consumer financial transactions being categorized according to the desires of the associated contributing consumer;

identifying one or more contributing consumer attributes associated with one or more of the one or more contributing consumers, wherein the one or more contributing consumer attributes are distinct from and thus additional to the one or more contributing consumer financial transactions, wherein the process is operable to consider contributing consumer attributes comprising the contributing consumer's occupation/profession, the contributing consumer's marital status and number of dependents, whether the contributing consumer is a business owner or an employee, the contributing consumer's zip code, the contributing consumer's total assets, the size and location of the contributing consumer's house, the contributing consumer's total liabilities/debt, the contributing consumer's net worth, the contributing consumer's average discretionary spending, one or more details regarding the contributing consumer's spending habits or recurring expenses, the contributing consumer's age group, and one or more pieces of demographic data regarding the contributing consumer;

aggregating and categorizing the contributing consumer financial data based, at least in part, on the one or more contributing consumer attributes of the one or more of the one or more contributing consumers associated with the contributing consumer financial data;

obtaining user financial data, the user financial data being associated with a user, the user financial data comprising data representing at least one user financial transaction;

identifying at least one user attribute associated with the user, wherein the at least one user attribute is distinct from and thus additional to the at least one user financial transaction, wherein the process is operable to consider user attributes comprising the user's occupation/profession, the user's marital status and number of dependents, whether the user is a business owner or an employee, the user's zip code, the user's total assets, the size and location of the user's house, the user's total liabilities/debt, the user's net worth, the user's average discretionary spending, one or more details regarding the user's spending habits or recurring expenses, the user's age group, and one or more pieces of demographic data regarding the user;

searching the aggregated and/or categorized contributing consumer financial data for contributing consumer financial data and associated categorization data from contributing consumers having at least one contributing consumer attribute that is the at least one user attribute; and categorizing the at least one user financial transaction based, at least in part, on the categorization of similar contributing consumer financial transactions by contributing consumers having at least one contributing consumer attribute that is the at least one user attribute.

8. The computer program product for providing a process for automatic categorization of financial transactions of claim 7, wherein;

obtaining contributing consumer financial data from one or more contributing consumers comprises:

obtaining contributing consumer financial data from the one or more contributing consumers that is designated by the one or more contributing consumers as sharable contributing consumer financial data.

9. The computer program product for providing a process for automatic categorization of financial transactions of claim 7, wherein;

obtaining contributing consumer financial data from one or more contributing consumers comprises:

obtaining contributing consumer financial data from the one or more contributing consumers from a computing system implemented financial management system.

10. The computer program product for providing a process for automatic categorization of financial transactions of claim 9, wherein;

the contributing consumer financial transactions are categorized according to the desires of the associated contributing consumer by the computing system implemented financial management system.

11. The computer program product for providing a process for automatic categorization of financial transactions of claim 7, wherein;

aggregating and categorizing the contributing consumer financial data based, at least in part, on the one or more contributing consumer attributes of the one or more of the one or more contributing consumers associated with the contributing consumer financial data comprises aggregating and categorizing the contributing consumer financial data based on the one or more contributing consumer attributes of the one or more of the one or more contributing consumers associated with the contributing consumer financial data and the categorization of the financial transactions made according to the desires of the associated contributing consumer.

12. The computer program product for providing a process for automatic categorization of financial transactions of claim 7, wherein;

obtaining user financial data, the user financial data comprising data representing at least one user financial transaction comprises obtaining the user financial data from a computing system implemented financial management system.

13. A system for automatic categorization of financial transactions comprising:

means for obtaining contributing consumer financial data from one or more contributing consumers, the contributing consumer financial data comprising data representing one or more contributing consumer financial transactions, the contributing consumer financial transactions being categorized according to the desires of the associated contributing consumer;

means for identifying one or more contributing consumer attributes associated with one or more of the one or more contributing consumers, wherein the one or more contributing consumer attributes are distinct from and thus additional to the one or more contributing consumer financial transactions, wherein the system is operable to consider contributing consumer attributes comprising the contributing consumer's occupation/profession, the contributing consumer's marital status and number of dependents, whether the contributing consumer is a business owner or an employee, the contributing consumer's zip code, the contributing consumer's total assets, the size and location of the contributing consumer's house, the contributing consumer's total liabilities/debt, the contributing consumer's net worth, the contributing consumer's average discretionary spending, one or more details regarding the contributing consumer's spending habits or recurring expenses, the contributing consumer's age group, and one or more pieces of demographic data regarding the contributing consumer;

means for aggregating and categorizing the contributing consumer financial data based, at least in part, on the one or more contributing consumer attributes of the one or more of the one or more contributing consumers associated with the contributing consumer financial data;

means for obtaining user financial data, the user financial data being associated with a user, the user financial data comprising data representing at least one user financial transaction;

means for identifying at least one user attribute associated with the user, wherein the at least one user attribute is distinct from and thus additional to the at least one user financial transaction, wherein the system is operable to consider user attributes comprising the user's occupation/profession, the user's marital status and number of dependents, whether the user is a business owner or an employee, the user's zip code, the user's total assets, the size and location of the user's house, the user's total liabilities/debt, the user's net worth, the user's average discretionary spending, one or more details regarding the user's spending habits or recurring expenses, the user's age group, and one or more pieces of demographic data regarding the user;

means for searching the aggregated and/or categorized contributing consumer financial data for contributing consumer financial data and associated categorization data from contributing consumers having at least one contributing consumer attribute that is the at least one user attribute; and means for categorizing the at least one user financial transaction based, at least in part, on the categorization of similar contributing consumer financial transactions by contributing consumers having at least one contributing consumer attribute that is the at least one user attribute.

14. The system for automatic categorization of financial transactions of claim 13, wherein;

the means for obtaining contributing consumer financial data from one or more contributing consumers comprises:

means for obtaining contributing consumer financial data from the one or more contributing consumers that is designated by the one or more contributing consumers as sharable contributing consumer financial data.

15. The system for automatic categorization of financial transactions of claim 13, wherein;
    the means for obtaining contributing consumer financial data from one or more contributing consumers comprises:
    means for obtaining contributing consumer financial data from the one or more contributing consumers from a computing system implemented financial management system.

16. The system for automatic categorization of financial transactions of claim 15, wherein;
    the contributing consumer financial transactions are categorized according to the desires of the associated contributing consumer by the computing system implemented financial management system.

17. The system for automatic categorization of financial transactions of claim 13, wherein;
    the means for aggregating and categorizing the contributing consumer financial data based, at least in part, on the one or more contributing consumer attributes of the one or more of the one or more contributing consumers associated with the contributing consumer financial data comprises means for aggregating and categorizing the contributing consumer financial data based on the one or more contributing consumer attributes of the one or more of the one or more contributing consumers associated with the contributing consumer financial data and the categorization of the financial transactions made according to the desires of the associated contributing consumer.

18. The system for automatic categorization of financial transactions of claim 13, wherein;
    the means for obtaining user financial data, the user financial data comprising data representing at least one user financial transaction comprises means for obtaining the user financial data from a computing system implemented financial management system.

* * * * *